United States Patent
Kwak et al.

(10) Patent No.: US 9,728,825 B2
(45) Date of Patent: Aug. 8, 2017

(54) DEVICE FOR INDIRECTLY COOLING BATTERY MODULE OF ECO-FRIENDLY VEHICLE

(71) Applicant: Hyundai Motor Company, Seoul (KR)

(72) Inventors: Jin Woo Kwak, Gyeongsangbuk-do (KR); Do Suck Han, Gyeonggi-do (KR); Gun Goo Lee, Gyeonggi-do (KR); Kyong Hwa Song, Seoul (KR); Hyuk Kang, Gyeonggi-do (KR); Jeong Hun Seo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 745 days.

(21) Appl. No.: 14/059,926

(22) Filed: Oct. 22, 2013

(65) Prior Publication Data

US 2014/0318746 A1  Oct. 30, 2014

(30) Foreign Application Priority Data

Apr. 26, 2013 (KR) ........................ 10-2013-0046449

(51) Int. Cl.
*H01M 10/613* (2014.01)
*H01M 10/6557* (2014.01)
(Continued)

(52) U.S. Cl.
CPC .... *H01M 10/5059* (2013.01); *F28D 15/0275* (2013.01); *H01M 10/613* (2015.04);
(Continued)

(58) Field of Classification Search
None
See application file for complete search history.

(56) References Cited

U.S. PATENT DOCUMENTS 8,231,996 B2   7/2012  Howard et al.
2005/0233206 A1 * 10/2005  Puttaiah ................ H01M 2/024
                                                          429/120
(Continued)

FOREIGN PATENT DOCUMENTS

CN      104871640 A  *  8/2015  ............... H05B 3/20
EP      2565977 A1       3/2013
(Continued)

*Primary Examiner* — Sarah A Slifka
*Assistant Examiner* — Haroon S Sheikh
(74) *Attorney, Agent, or Firm* — Mintz Levin Cohn Ferris Glovsky and Popeo, P.C.; Peter F. Corless

(57) ABSTRACT

A device for indirectly cooling a battery module of an eco-friendly vehicle is provided that cools the battery module using an interfacial plate into which a heat pipe is inserted to maximize battery heat emission performance and simultaneously prevent degradation of battery performance. A thermally-conductive interfacial plate in which a heat pipe is embedded by over-molding is disposed between battery cells and a heat sink, which is a condensation unit, integrally connected to an upper end of the heat pipe is disposed in a cooling air flow path to improve contact strength between the interfacial plate and the battery cells. A planar heat emitter is disposed between the battery cells where the interfacial plate is not disposed to heat the battery to a proper-level temperature in a cold-start environment and a low-temperature environment, thereby improving battery performance and preventing degradation in vehicle power.

14 Claims, 5 Drawing Sheets

(51) Int. Cl.
*F28D 15/02* (2006.01)
*H01M 10/625* (2014.01)
*H01M 10/6552* (2014.01)
*F28D 21/00* (2006.01)

(52) U.S. Cl.
CPC ..... *H01M 10/625* (2015.04); *H01M 10/6552* (2015.04); *H01M 10/6557* (2015.04); *F28D 2021/0028* (2013.01); *H01M 2220/20* (2013.01)

(56) References Cited

U.S. PATENT DOCUMENTS

| | | | |
|---|---|---|---|
| 2011/0206965 A1 | 8/2011 | Han et al. | |
| 2012/0021260 A1* | 1/2012 | Yasui | F28D 15/0275 429/53 |
| 2012/0107665 A1 | 5/2012 | Abe et al. | |
| 2012/0219838 A1* | 8/2012 | Terada | H01M 10/0413 429/120 |
| 2013/0244066 A1* | 9/2013 | Kang | H01M 2/1077 429/62 |
| 2015/0325892 A1* | 11/2015 | Yue | H05B 3/20 429/120 |

FOREIGN PATENT DOCUMENTS

| | | | |
|---|---|---|---|
| JP | 61-260551 | 11/1986 | |
| KR | 10-2007-0041064 | 4/2007 | |
| KR | 10-1055422 B1 | 8/2011 | |
| KR | 10-2012-0053596 | 5/2012 | |
| KR | 10-2012-0102345 | 9/2012 | |
| ZA | WO2012153230 A1 * | 11/2012 | ......... H01M 10/142 |

* cited by examiner

DEVICE FOR INDIRECTLY COOLING BATTERY MODULE OF ECO-FRIENDLY VEHICLE

CROSS-REFERENCE TO RELATED APPLICATION

This application claims under 35 U.S.C. §119(a) the benefit of Korean Patent Application No. 10-2013-0046449 filed on Apr. 26, 2013, the entire contents of which are incorporated herein by reference.

BACKGROUND (a) Technical Field

The present disclosure relates to a device for indirectly cooling a battery module of an eco-friendly vehicle, and more particularly, to a device for indirectly cooling a battery module of an eco-friendly vehicle, that indirectly cools the battery module using an interfacial plate into which a heat pipe is inserted, to maximize battery heat emission performance and simultaneously, prevent degradation of battery performance.

(b) Background Art

Eco-friendly vehicles refer to electric vehicles, fuel-cell vehicles, or the like which generate no emissions, and in the eco-friendly vehicles, batteries are mounted to drive motors for driving a vehicle. Since the reliability and stability of a battery system serve as important factors for determining the productivity of electric vehicles, the battery system should be maintained at a proper temperature range of about 35° C.-40° C. to prevent battery performance from degrading due to change in various external temperatures. Thus, a need exists for a heat control system for a pouch cell module exhibiting improved heat emission performance in a general climate condition and that maintains a proper temperature of a battery in a low-temperature environment.

For a battery of an electric vehicle, a local temperature difference may be generated between battery cells due to heat generated by fast charging, high power, the number of times of repetitive charging, or the like, or a thermal runaway may occur which deteriorates the battery's efficiency and stability. These phenomena are known as occurring since heat emission or heat diffusion to the outside the battery is insufficient when compared to heat generated inside the battery.

A pouch-type battery cell undergoes a change in volume due to intercalation and deintercalation of lithium ions into electrode materials during charging and discharging, causing potential damage in a separator between two electrode materials as well as expansion of electrodes in the battery. The damage in the separator causes battery performance degradation and battery final capacity reduction as well as internal resistance generation, and thus, a heat-emission interfacial material for coping with battery volume expansion is required.

When the pouch-type battery expands significantly, a polymer pouch may be damaged and thus internal electrolyte may leak and gas may be discharged. Since a pouch-type cell module is configured by stacking several cells, when expansion or gas emission or explosion occurs, direct damage may occur to neighboring cells. Expansion of the pouch-type battery may accelerate heat emission by reducing the size of a cooling air flow path for cooling between battery cells.

Moreover, as an example of conventional techniques, a direct cooling scheme is widely known in which a cooling air directly contacts the surface of the battery to emit heat generated in the battery. In particular, the cooling air directly cools the battery and thus thermal conductivity of a housing material that encloses the battery may be omitted; but a cooling air flow path in which the cooling air flows should be secured in a predetermined size or larger between battery cells, thus limiting an increase in the number of cells inserted per unit volume.

A known conventional technique discloses a battery heat emission structure using a heat pipe in which a battery heat emission feature may be improved by forming an indirect cooling structure in which the heat pipe of a flat panel type is inserted between lithium ion batteries and heat emission pins in the form of louvered fins, which are condensations, intersect each other in an upper portion of the heat pipe. However, such a technique may not handle volume expansion of a battery (e.g., a pouch-type battery) due to fast charging/discharging.

Generally, the surface of the pouch-type battery is not even, and thus, when the heat pipe of a flat panel type disclosed in the conventional techniques is placed between the battery cells, an interfacial delivery resistance may be generated due to degradation of flatness between the flat panel type heat pipe and the battery cell. In addition, a flat panel type heat pipe applied in another embodiment of the conventional examples directly contacts the surface of the battery, causing a potential tear in the pouch type battery by metallic burr generated in heat pipe manufacturing during vehicle's vibration or battery module assembly.

Moreover, another disadvantage of a conventional battery module is that a material or a device is not provided to cope with cold start of the vehicle or power degradation in a low-temperature environment. In other words, as illustrated in FIG. 1, a general lithium ion battery may cause vehicle power performance degradation in a low-temperature environment, and more specifically, power performance may begin to be degraded from about 10° C. or lower, such that a performance degradation of about 30% is degraded at about −20° C. Therefore, a separate material or device is needed which may heat the battery to about 30° C.-40° C. in a cold start and low-temperature environment.

SUMMARY

Accordingly, the present invention provides a device for indirectly cooling a battery module of an eco-friendly vehicle, in which a heat-conductive interfacial plate in which a heat pipe is over-molded and imbedded is closely disposed between battery cells and a heat sink that is a condensation unit connected integrally to an upper end of the heat pipe is placed on an air cooling path, to improve adherence between the interfacial plate and the battery cell and thus maximizing the heat-emission performance of the battery to prevent volume expansion caused by heat emission.

The present invention also provides a device for indirectly cooling a battery module of an eco-friendly vehicle, in which a planar heat emitter is disposed between battery cells where an interfacial plate is not disposed to heat a battery to temperatures of a proper level in cold start and a low-temperature environment, to improve battery performance and preventing degradation of vehicle power.

According to an aspect of the present invention, a device for indirectly cooling a battery module of an eco-friendly vehicle may include a thermally-conductive interfacial plate, in which heat pipes are embedded by over-molding, is disposed in a close-contact manner between two or more selected from a plurality of battery cells; and a heat sink integrally connected to an upper end portion of each heat pipe and is placed in a cooling air flow path.

The interfacial plate may use a thermoplastic elastomer material having a high thermal conductivity. The heat pipes may be in a flat-panel shape having a strip form using an aluminum material and may be embedded at equal intervals in the interfacial plate. The heat pipe may be manufactured to have a thickness of about 1.0-1.5 mm, and the interfacial plate may be molded to have a thickness of about 2-5 mm including a thickness of the heat pipe. The heat sink may be a condensation unit that condenses working fluid evaporated in the heat pipe, and may include a plurality of heat-emission plates formed at equal intervals in a vertical direction integrally in an upper end portion of the heat pipe.

In addition, a planar heat emitter having a thickness of about 0.5 mm or less may be disposed in a close-contact manner between battery cells where the interfacial plate is not disposed. The planar heat emitter may include a film in which a polyurethane layer for complete surface-contact with a battery cell and a polyethylene terephthalate (PET) layer for heat resistance in heat emission are laminated to each other, a heat emitter coated on the PET layer of the film, and a protection layer of liquid silane resin (LSR) coated and surface-hardened on the heat emitter to protect the heat emitter.

The outer housing that encloses the battery cells may be made of a material having a low thermal conductivity and the single cooling air flow path in which the heat sink is placed may be formed in an upper end portion of the outer housing.

BRIEF DESCRIPTION OF THE DRAWINGS

The above and other features of the present invention will now be described in detail with reference to an exemplary embodiment thereof illustrated the accompanying drawings which are given hereinbelow by way of illustration only, and thus are not limitative of the present invention, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the present invention will be described in detail with reference to the accompanying drawings to allow those of ordinary skill in the art to easily carry out the present invention.

Figure 1:
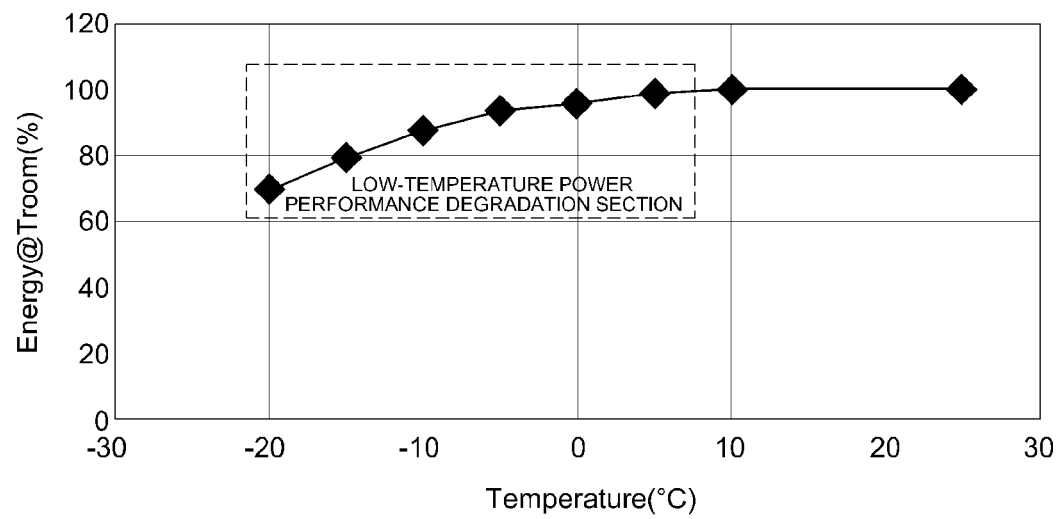
FIG. 1 is an exemplary graph illustrating a low-temperature power performance degradation section of an eco-friendly vehicle according to the related art.
Figure 2:
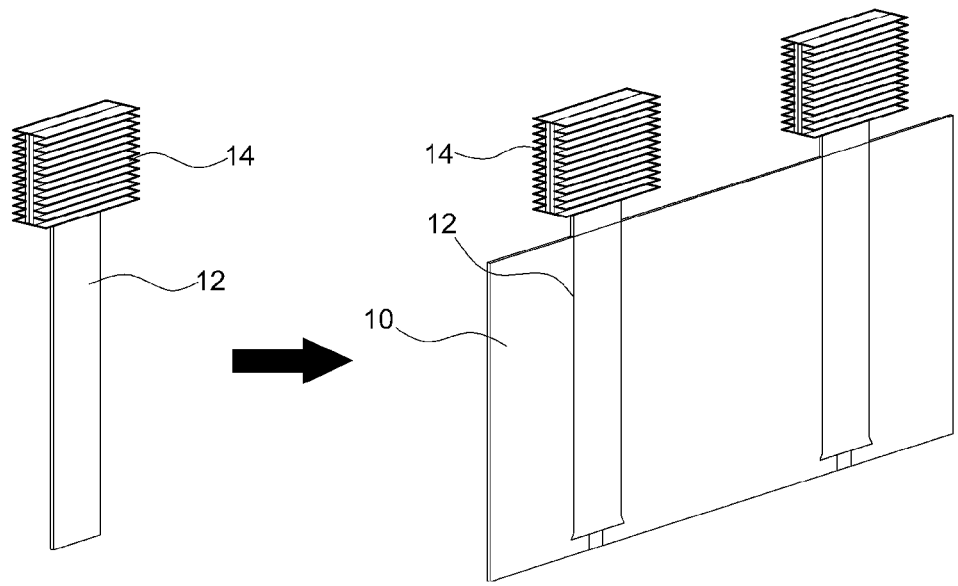
FIG. 2 is an exemplary view illustrating a heat pipe and an interfacial plate of a device for directly cooling a battery module of an eco-friendly vehicle according to an exemplary embodiment of the present invention.
Figure 3:
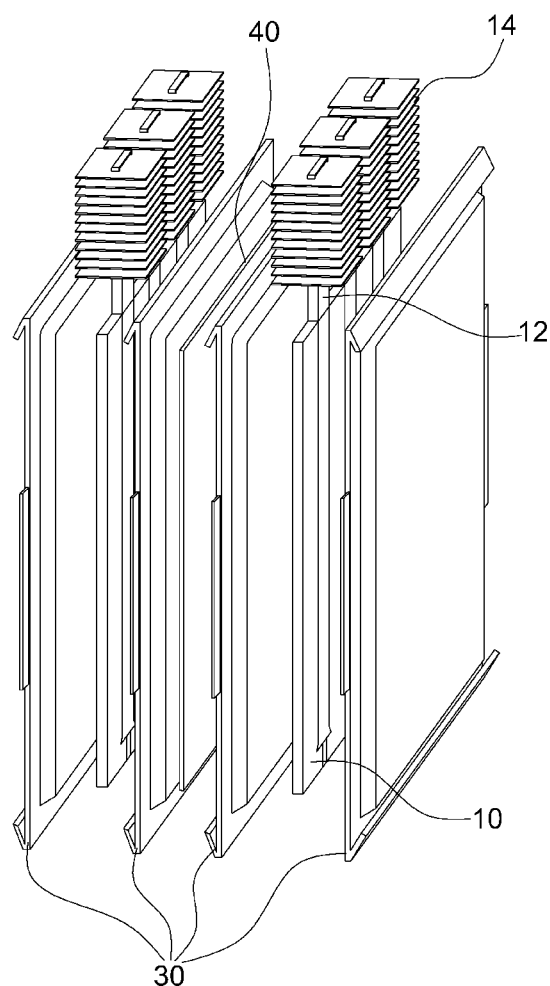
FIG. 3 is an exemplary view illustrating an interfacial plate and a planar heat emitter of a device for directly cooling a battery module of an eco-friendly vehicle between battery cells according to an exemplary embodiment of the present invention.
Figure 4:
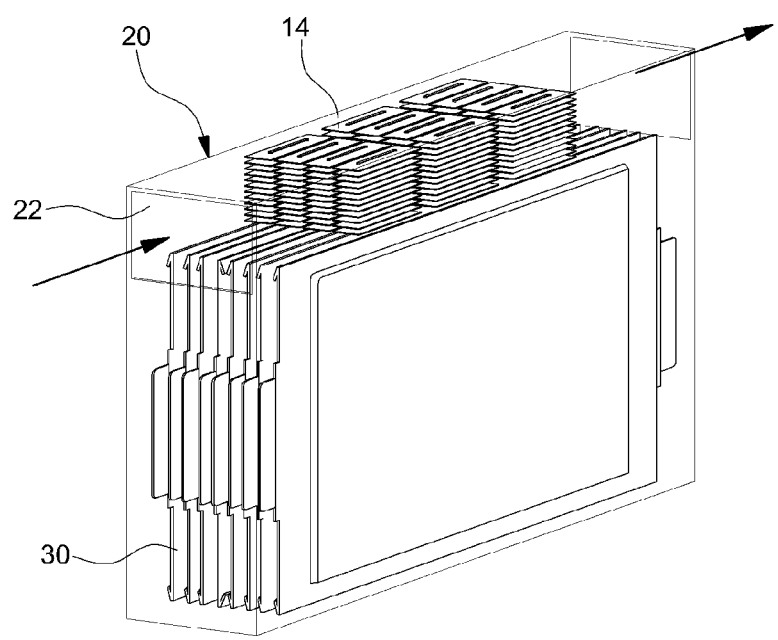
FIG. 4 is an exemplary view illustrating a heat pipe and an interfacial plate of a device for directly cooling a battery module of an eco-friendly vehicle arranged between battery cells and enclosed by an outer housing according to an exemplary embodiment of the present invention.

Referring to FIGS. 2 and 4, a device for indirectly cooling a battery module according to the exemplary embodiment of the present invention may include a thermally-conductive interfacial plate 10 in which heat pipes 12 are embedded by over-molding. Since the interfacial plate 10 preferably has a minimized interfacial pore and reduced flatness to effectively transfer heat generated in a battery cell to the heat pipe 12 and the interfacial plate 10, when disposed between the battery cells, a heat-transfer interfacial resistance may be minimized by providing a contact gripping property (e.g., complete adhesive property) with battery cells, and simultaneously, heat transfer property may be maximized, and the interfacial plate 10 may use a thermoplastic elastomer material having high thermal conductivity.

More specifically, the interfacial plate 10 may use a thermoplastic elastomer material that has an increased thermal conductivity of about 10 W/mk or more toward a flat panel and may be a soft material to improve close-contact strength with the battery cells, thus responding to volume expansion of a battery (especially, a pouch-type battery).

The heat pipes 12 may be in the shape of rectangular strips using an aluminum material, and may be embedded at equal intervals in the interfacial plate 10 and a heat sink 14 may be integrally formed in an upper end portion of the heat pipe 12 to transfer heat energy generated in heat emission of the battery from the interfacial plate 10 toward a cooling air path 22 of an outer housing 20. The heat sink 14 is a condensation unit that may condense working fluid vaporized in the heat pipe 12 and may be include a plurality of heat emission plates integrally formed in an upper end portion of the heat pipe 12 at equal intervals in a vertical direction.

For reference, volatile working fluid (e.g., acetone) may be filled in the heat pipe 12, and this working fluid may evaporate by heat during heat emission of the battery and simultaneously, may move with heat energy toward the heat sink 14 and may emit heat, and then may be condensed while emitting heat and thus may return into the heat pipe 12. Preferably, considering compactness of the battery module, the heat pipe 12 is manufactured to have a thickness of about 1.0-1.5 t, and the interfacial plate 10 is over-molded to a thickness of about 2-5 mm including a thickness of the heat pipe 12.

The interfacial plate 10, that is, the interfacial plate 10 in which the heat pipe 12 is embedded may be disposed in a close-contact manner between two or more of a plurality of battery cells 30, and the heat sink 14 integrally connected to the upper end portion of the heat pipe 12 may be placed in the cooling air flow path 22 of the outer housing 20. For example, when one battery module includes a total of 8 battery cells, a 3-heat-pipe-embedded interfacial plate may be disposed between a cell 1 and a cell 2, between a cell 3 and a cell 4, and between a cell 5 and a cell 6, respectively, and planar heat emitters 40 described below may be disposed between a cell 2 and a cell 3, between a cell 4 and a cell 5, and between a cell 6 and a cell 7.

The planar heat emitter 40 may be used to heat the battery module to a proper-level temperature in cold start or a low-temperature environment. The planar heat emitter 40 may be disposed in a close-contact manner in the form of a pad having a thickness of about 0.5 mm or less between battery cells where the interfacial plate 10 is not disposed.

Figure 5:
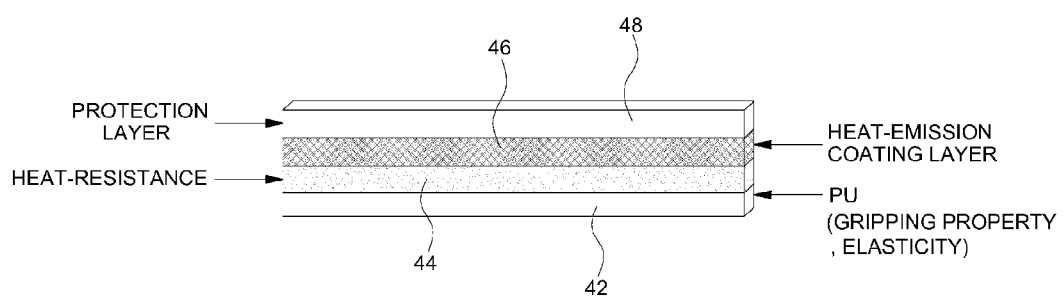
FIG. 5 is an exemplary schematic cross-sectional view illustrating a cross-sectional structure of a planar heat emitter of a device for directly cooling a battery module of an eco-friendly vehicle according to an exemplary embodiment of the present invention.

Preferably, as illustrated in FIG. 5, the planar emitter 40 may use a film in which a polyurethane layer 42 and a polyethylene terephthalate (PET) layer 44 are laminated to each other. The polyurethane layer 42 may provide a gripping property for contacting the battery cell while responding to volume expansion of the battery (especially, a pouch-type battery). The PET layer 44 may manage heat resistance in heat emission. A general heat emitter 46 may be stacked and attached onto the PET layer 44 of the film.

More preferably, a separate auxiliary power source and a separate control unit are connected to the heat emitter 46 such that automatic heat emission or temperature adjustment may be performed by control of the control unit at low temperatures. A protection layer 48 may be formed on the heat emitter 46 by coating and surface-hardening liquid silane resin (LSR), and this protection layer 48 may protect the heat emitter 46 and prevent delamination of the brittle heat emitter 46.

The battery cells 30 including the interfacial plate 10 and the planar heat emitter 40 may be enclosed by the outer housing 20 that is a type of battery case, as illustrated in FIG. 4, and the single cooling air flow path 22 in which the heat sink 14 is placed may be formed in an upper end portion of the outer housing 20. Preferably, the outer housing 20 may not emit heat generated in the battery and thus may be made of a material having low thermal conductivity since when battery heating using the planar heat emitter is required in a low-temperature environment, battery heating speed may be further enhanced by blocking external heat.

A description will now be made of an operating flow of the device for indirectly cooling the battery module according to an exemplary embodiment of the present invention structured as described above.

Once heat is generated by fast charging, high power, the number of times of repetitive charging, or the like of the battery cell 20, the generated heat may be delivered to the heat pipe 12 through the interfacial plate 10. Due to the heat delivered to the heat pipe 12, working fluid inside (in an evaporation unit) the heat pipe 12 may evaporate and the evaporated gas molecules having heat energy may move to the opposite side of the heat pipe 12, that is, towards a side (the condensation unit) in which the heat sink 14 is attached. In particular, the heat sink 14 may contact the cooling air that passes through the cooling air flow path 22 of the outer housing 20, to emit heat energy of the working fluid via the heat sink 14 and simultaneously, the working fluid may be condensed and moved back to the heat pipe 12.

In a cold start environment or a low-temperature environment of an eco-friendly vehicle, heat emission of the planar heat emitter 40 may be performed to heat the battery to a proper-level temperature, thus improving battery performance and preventing degradation of power of the vehicle. In particular, when the planar heat emitter 40 performs heat emission, a blower may be controlled to not blow the cooling air into the cooling air flow path 22 of the outer housing 20, and thus the heat transferred to the battery cell 30 from the planar heat emitter 40 may be used only for heating the battery cell 30 to a proper-level temperature. In other words, by preventing the heat transferred to the battery cell 30 from the planar heat emitter 40 from being emitted to the heat sink 14 through the interfacial plate 10 and the heat pipe 12, cold-start performance may be improved.

Herein, the present invention will be considered using experimental examples.

A battery module test product was manufactured in which a 2-heat-piep-embedded interfacial plate is disposed between a cell 1 and a cell 2, between a cell 3 and a cell 4, between a cell 5 and a cell 6, and between a cell 7 and a cell 8 among 8 battery cells, respectively, and was subject to a battery cooling performance test. To verify the cooling performance of an indirect cooling scheme, the battery cooling performance test was performed without disposing the planar heat emitter in any battery cell.

First, battery cooling performance was interpreted using a computer program, and the interpretation conditions were that a heat emission amount of the battery cell was 2 W/cell and an air flow into a cooling air flow path was 13 CMH and the interpretation results are as shown in Table 1.

TABLE 1

| Cell | Temperature (° C.) | Peak Temperature | Temperature Deviation |
|---|---|---|---|
| 1 | 42.21 | 42.30 | 0.09 |
| 2 | 42.23 | | |
| 3 | 42.28 | | |
| 4 | 42.30 | | |
| 5 | 42.30 | | |
| 6 | 42.27 | | |
| 7 | 42.23 | | |
| 8 | 42.21 | | |

As shown in Table 1, temperatures of the respective battery cells all are less than 42° C. and a temperature deviation among the battery cells is 0.09° C. at most, which demonstrates superior battery cooling effect.

Figure 6:
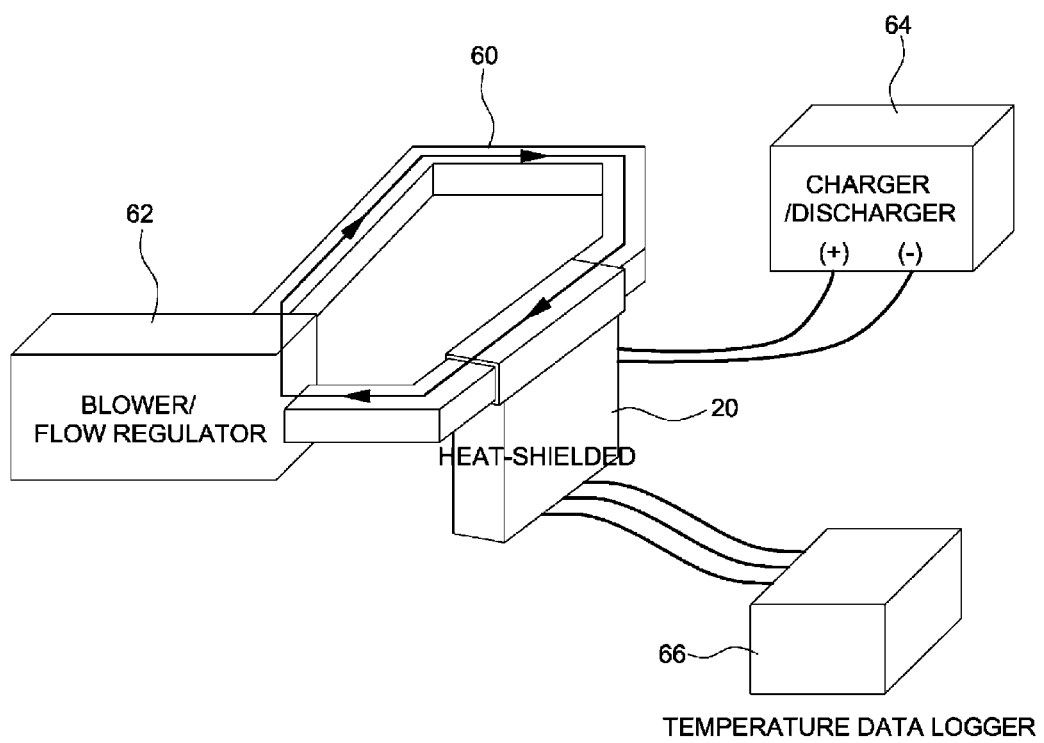
FIG. 6 is an exemplary schematic diagram illustrating a structure for testing heat emission performance of a device for directly cooling a battery module of an eco-friendly vehicle according to an exemplary embodiment of the present invention.

To verify the foregoing interpretation results, as illustrated in FIG. 6, a test equipment is established which includes a cooling air circulation line 60 connected to a cooling air flow path of the heat-shielded outer housing 20, a blower/flow regulator 62 mounted in a specific position of the cooling air circulation line 60, a charger/discharger 64 that charges and discharges the respective battery cells, and a temperature data logger 66 that receives a temperature value from a temperature sensor connected to each battery cell.

Figure 7:
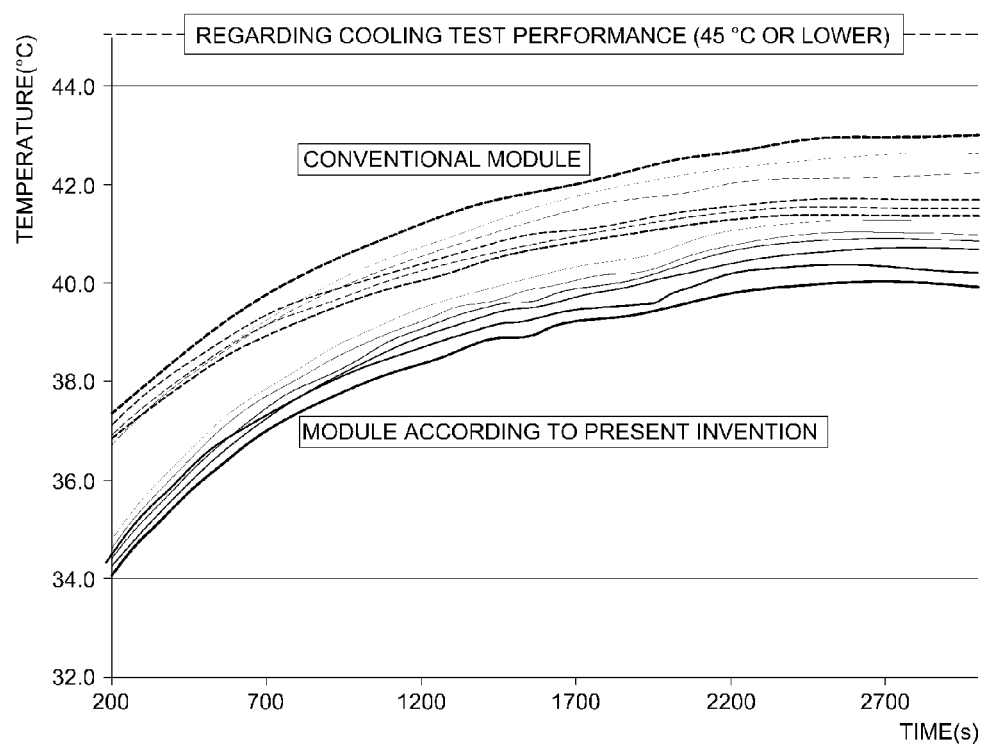
FIG. 7 is an exemplary graph illustrating test results with respect to cooling performance of a battery module and a conventional module of an eco-friendly vehicle according to an exemplary embodiment of the present invention.

For the battery cooling test, the battery module test product was heat-shielded and thus was maintained at 35.5° C., and in this state, an air flow of 13.3 CMH was blown into the cooling air flow path of the outer housing using the blower/flow regulator 62 and the humidity was maintained at 65±20%. In such test conditions, a charging/discharging pulse of 40 A was applied for 10 seconds in 60% state of charge (SOC) of the battery and a temperature of each battery cell was checked, and the results are shown in FIG. 7.

When the temperature of each battery cell is checked, and the temperature of each battery cell is lower than 45° C. and a temperature deviation between the battery cells is less than 5° C., then it may be determined that the battery cooling effect is demonstrated. As illustrated in FIG. 7, it may be seen that the temperature of each battery cell of the test product is less than 42° C. and a temperature deviation among the battery cells is 2.0° C. or less, thus demonstrating excellent battery cooling effect, compared to a conventional battery module (e.g., direct cooling type).

According to the present invention, a thermally-conductive interfacial plate in which a heat pipe, as a heat emission interfacial material that responds to volume expansion of a battery (especially, a pouch-type battery), is embedded by over-molding may be disposed in a close-contact manner between battery cells selected from a plurality of battery cells of a battery module of an eco-friendly vehicle, to improve close-contact strength between the high-thermal-conductivity interfacial plate and the battery cells, and thus preventing volume expansion caused by heat emission and maximizing heat-emission performance of the battery.

In particular, by further disposing the planar heat emitter between the battery cells in which the interfacial plate is not disposed, the battery may be heated to the proper-level temperature in the cold start environment and the low-temperature environment of the eco-friendly vehicle, thus improving battery performance and preventing degradation in vehicle's power.

Moreover, when compared to a direct cooling type battery module which directly cools the battery by forming the cooling air flow path between the battery cells, a more compact battery module may be provided and the freedom of design of the battery module may be improved, since the cooling air flow path is not formed between the battery cells.

While the exemplary embodiment of the present invention have been described in detail, the scope of the present invention is not limited to the foregoing embodiment and various modifications and improves made by those of ordinary skill in the art using the basic concept of the present invention defined in the accompanying claims are also included in the scope of the present invention.

| Description of Reference Numerals | |
|---|---|
| 10: Interfacial Plate | 12: Heat Pipe |
| 14: Heat Sink | 20: Outer Housing |
| 22: Cooling Air Flow Path | 30: Battery Cell |
| 40: Planar Heat Emitter | 44: Polyethylene Terephthalate Layer |
| 46: Heat Emitter | 48: Protection Layer |

What is claimed is:

1. A device for indirectly cooling a battery module of an eco-friendly vehicle, comprising:
  a thermally-conductive interfacial plate in which over-molded heat pipes are embedded, the thermally-conductive interfacial plate disposed between at least two battery cells; and
  a heat sink integrally connected to an upper end portion of each over-molded heat pipe, the heat sink disposed in a cooling air flow path; and
  a planar heat emitter disposed between battery cells where the interfacial plate is not disposed;
  wherein the planar heat emitter includes;
  a film in which a polyurethane layer for surface-contact with a battery cell and a polyethylene terephthalate (PET) layer for heat resistance in heat emission are laminated to each other;
  a heat emitter on the PET layer of the film; and
  a protection layer of liquid silane resin (LSR) coated and surface-hardened on the heat emitter to protect the heat emitter.

2. The device of claim 1, wherein the interfacial plate uses a thermoplastic elastomer material having a high thermal conductivity.

3. The device of claim 1, wherein the heat pipes have a flat-panel shape having a strip form using an aluminum material and are embedded at equal intervals in the interfacial plate.

4. The device of claim 3, wherein the heat pipe is manufactured to have a thickness of about 1.0-1.5 mm, and the interfacial plate is molded to have a thickness of about 2-5 mm including a thickness of the heat pipe.

5. The device of claim 1, wherein the heat sink is a condensation unit that condenses working fluid evaporated in the heat pipe, and includes a plurality of heat-emission plates formed at equal intervals in a vertical direction integrally in an upper end portion of the over-molded heat pipe.

6. The device of claim 1, wherein:
  the planar heat emitter has a thickness equal to or less than about 0.5 mm.

7. The device of claim 1, wherein the outer housing that encloses the battery cells is made of a material having a low thermal conductivity and the cooling air flow path in which the heat sink is disposed is formed in an upper end portion of the outer housing.

8. A device for indirectly cooling a battery module of a vehicle operable in at least an HEV (Hybrid Electric Vehicle) mode and an EV (Electric Vehicle) mode, comprising:
  a thermally-conductive interfacial plate in which over-molded heat pipes are embedded, the thermally-conductive interfacial plate disposed between at least two battery cells;
  a heat sink integrally connected to an upper end portion of each over-molded heat pipe, the heat sink disposed in a cooling air flow path; and
  a planar heat emitter disposed between battery cells where the interfacial plate is not disposed;
  wherein the planar heat emitter includes:
  a film in which a polyurethane layer for surface-contact with a battery cell and a polyethylene terephthalate (PET) layer for heat resistance in heat emission are laminated to each other;
  a heat emitter coated on the PET layer of the film; and a protection layer of liquid silane resin (LSR) coated and surface-hardened on the heat emitter to protect the heat emitter.

9. The device of claim 8, wherein the interfacial plate uses a thermoplastic elastomer material having a high thermal conductivity.

10. The device of claim 8, wherein the heat pipes have a flat-panel shape having a strip form using an aluminum material and are embedded at equal intervals in the interfacial plate.

11. The device of claim 10, wherein the heat pipe is manufactured to have a thickness of about 1.0-1.5 mm, and the interfacial plate is molded to have a thickness of about 2-5 mm including a thickness of the heat pipe.

12. The device of claim 8, wherein the heat sink is a condensation unit that condenses working fluid evaporated in the heat pipe, and includes a plurality of heat-emission plates formed at equal intervals in a vertical direction integrally in an upper end portion of the over-molded heat pipe.

13. The device of claim 8, wherein:
the planar heat emitter has a thickness equal to or less than about 0.5 mm.

14. The device of claim 8, wherein the outer housing that encloses the battery cells is made of a material having a low thermal conductivity and the cooling air flow path in which the heat sink is disposed is formed in an upper end portion of the outer housing.

* * * * *